US009245693B2

(12) United States Patent  
Eilertsen

(10) Patent No.: US 9,245,693 B2  
(45) Date of Patent: Jan. 26, 2016

(54) HIGH VOLTAGE EDLC CELL AND METHOD FOR THE MANUFACTURE THEREOF

(75) Inventor: Thor E. Eilertsen, Oneonta, NY (US)

(73) Assignee: IOXUS, INC., Oneonta, NY (US)

( * ) Notice: Subject to any disclaimer, the term of this patent is extended or adjusted under 35 U.S.C. 154(b) by 1257 days.

(21) Appl. No.: 13/061,409

(22) PCT Filed: Aug. 28, 2009

(86) PCT No.: PCT/US2009/055299  
§ 371 (c)(1),  
(2), (4) Date: May 13, 2011

(87) PCT Pub. No.: WO2010/025323  
PCT Pub. Date: Mar. 4, 2010

(65) Prior Publication Data  
US 2011/0271855 A1    Nov. 10, 2011

Related U.S. Application Data

(63) Continuation-in-part of application No. 12/229,922, filed on Aug. 28, 2008, now Pat. No. 8,411,413.

(51) Int. Cl.  
*H01G 11/04* (2013.01)  
*H01G 11/26* (2013.01)  
(Continued)

(52) U.S. Cl.  
CPC ............... *H01G 11/04* (2013.01); *H01G 11/26* (2013.01); *H01G 11/28* (2013.01); *H01G 11/52* (2013.01); *H01G 11/86* (2013.01); *B32B 38/14* (2013.01); *G09F 3/02* (2013.01); *G09F 3/10* (2013.01);  
(Continued)

(58) Field of Classification Search  
CPC .................. Y10T 156/1051; Y10T 156/1056; B65H 45/30; B43M 5/047; G09F 3/0289; G09F 3/02; G09F 3/10; A61F 13/15699; A61F 13/15747; B42D 15/10; B32B 38/14; B41M 7/0027; B29C 2793/0045; B29C 65/02; B31B 1/90; B31B 23/00; B31B 2237/10; H01G 11/04; H01G 11/26; H01G 11/28; H01G 11/52; H01G 11/86; Y02E 60/13  
USPC ........ 156/227, 289, 250, 252, 277; 101/450.1  
See application file for complete search history.

(56) References Cited

U.S. PATENT DOCUMENTS 3,819,340 A    6/1974 Heier et al.  
4,383,897 A    5/1983 Gillich et al.  
(Continued)

FOREIGN PATENT DOCUMENTS

DE    3920573 A1 * 1/1991  
JP    1-253910    10/1989  
(Continued)

OTHER PUBLICATIONS

English translation of JP2007273738A.*  
(Continued)

*Primary Examiner* — Sonya Mazumdar  
(74) *Attorney, Agent, or Firm* — Cooley LLP

(57) ABSTRACT

A method of manufacturing an electrode includes printing an electrode ink on a portion of a substrate using a rotary lithographic printer. The electrode ink is allowed to dry on the substrate. A separator material is printed on the portion of the substrate using the rotary lithographic printer. A sealant wall is printed around the portion of the substrate using the rotary lithographic printer.

16 Claims, 13 Drawing Sheets

(51) Int. Cl.
*H01G 11/28* (2013.01)
*H01G 11/52* (2013.01)
*H01G 11/86* (2013.01)
*B32B 38/14* (2006.01)
*G09F 3/02* (2006.01)
*G09F 3/10* (2006.01)

(52) U.S. Cl.
CPC ............ *Y02E 60/13* (2013.01); *Y10T 156/1051* (2015.01); *Y10T 156/1056* (2015.01)

(56) References Cited

U.S. PATENT DOCUMENTS

| | | | |
|---|---|---|---|
| 4,683,516 A | 7/1987 | Miller | |
| 4,725,927 A | 2/1988 | Morimoto et al. | |
| 5,093,762 A | 3/1992 | Sato et al. | |
| 5,126,017 A | 6/1992 | Nakama et al. | |
| 5,150,283 A | 9/1992 | Yoshida et al. | |
| 5,324,373 A * | 6/1994 | Gillner | B32B 17/10036 156/196 |
| 5,618,318 A | 4/1997 | Reddy et al. | |
| 5,621,602 A | 4/1997 | Winkelmann | |
| 5,667,909 A | 9/1997 | Rodriguez et al. | |
| 5,723,231 A | 3/1998 | Wu et al. | |
| 5,729,427 A | 3/1998 | Li et al. | |
| 5,776,628 A | 7/1998 | Kraft et al. | |
| 5,850,331 A | 12/1998 | Matsumoto et al. | |
| 5,862,035 A | 1/1999 | Farahmandi et al. | |
| 5,907,472 A | 5/1999 | Farahmandi et al. | |
| 5,968,210 A | 10/1999 | Strange et al. | |
| 6,038,123 A | 3/2000 | Shimodaira et al. | |
| 6,045,942 A | 4/2000 | Miekka et al. | |
| 6,045,943 A | 4/2000 | Nowaczyk | |
| 6,059,847 A | 5/2000 | Farahmandi et al. | |
| 6,084,766 A | 7/2000 | Jerabek et al. | |
| 6,094,788 A | 8/2000 | Farahmandi et al. | |
| 6,099,600 A | 8/2000 | Yan et al. | |
| 6,135,144 A | 10/2000 | Rozek | |
| 6,201,686 B1 | 3/2001 | Hiratsuka et al. | |
| 6,212,059 B1 | 4/2001 | Uchikawa et al. | |
| 6,233,135 B1 | 5/2001 | Farahmandi et al. | |
| 6,246,569 B1 | 6/2001 | Strange et al. | |
| 6,282,081 B1 | 8/2001 | Takabayashi et al. | |
| 6,320,740 B1 | 11/2001 | Saito et al. | |
| 6,376,123 B1 | 4/2002 | Chu | |
| 6,379,402 B1 | 4/2002 | Suhara et al. | |
| 6,379,835 B1 | 4/2002 | Kucherovsky et al. | |
| 6,413,409 B1 | 7/2002 | Otowa et al. | |
| 6,426,863 B1 | 7/2002 | Munshi | |
| 6,430,031 B1 | 8/2002 | Dispennette et al. | |
| 6,451,073 B1 | 9/2002 | Farahmandi et al. | |
| 6,456,484 B1 | 9/2002 | Matsuoka et al. | |
| 6,493,209 B1 | 12/2002 | Kamath et al. | |
| 6,510,043 B1 | 1/2003 | Shiue et al. | |
| 6,515,845 B1 | 2/2003 | Oh et al. | |
| 6,594,139 B2 | 7/2003 | Muffoletto et al. | |
| 6,614,647 B2 | 9/2003 | Kamath | |
| 6,616,875 B2 | 9/2003 | Lee et al. | |
| 6,714,402 B2 | 3/2004 | Kamath | |
| 6,721,168 B2 | 4/2004 | Takeuchi et al. | |
| 6,740,447 B1 * | 5/2004 | Keshishian | H01G 4/26 429/178 |
| 6,758,868 B2 | 7/2004 | Munshi | |
| 6,762,926 B1 | 7/2004 | Shiue et al. | |
| 6,793,692 B2 | 9/2004 | Sato et al. | |
| 6,843,810 B2 | 1/2005 | Nakazawa et al. | |
| 6,876,539 B2 | 4/2005 | Michel et al. | |
| 6,967,183 B2 | 11/2005 | Hampden-Smith et al. | |
| 6,985,352 B2 | 1/2006 | Norton | |
| 6,995,969 B2 | 2/2006 | Araki et al. | |
| 7,009,833 B2 | 3/2006 | Paul et al. | |
| 7,087,348 B2 | 8/2006 | Holman et al. | |
| 7,092,239 B2 | 8/2006 | Nakazawa et al. | |
| 7,173,808 B2 | 2/2007 | Hirata et al. | |
| 7,180,725 B2 | 2/2007 | Takeuchi et al. | |
| 7,198,654 B1 | 4/2007 | Kim et al. | |
| 7,211,345 B2 | 5/2007 | Hampden-Smith et al. | |
| 7,261,920 B2 * | 8/2007 | Haubrich | G02F 1/13439 156/247 |
| 7,273,597 B2 | 9/2007 | Takeuchi et al. | |
| 7,382,600 B2 | 6/2008 | Paul et al. | |
| 7,394,648 B2 | 7/2008 | Kondo et al. | |
| 7,400,490 B2 | 7/2008 | Gunderman et al. | |
| 7,541,782 B2 | 6/2009 | Narendra et al. | |
| 7,706,130 B2 | 4/2010 | Shimoyama et al. | |
| 7,755,879 B2 | 7/2010 | Yoshida et al. | |
| 8,411,413 B2 | 4/2013 | Eilertsen | |
| 2003/0049538 A1 | 3/2003 | Buerger et al. | |
| 2003/0172509 A1 | 9/2003 | Maletin et al. | |
| 2003/0192170 A1 | 10/2003 | Jan et al. | |
| 2003/0202316 A1 | 10/2003 | Kawasato et al. | |
| 2004/0062989 A1 | 4/2004 | Ueno et al. | |
| 2004/0085710 A1 | 5/2004 | Takeuchi et al. | |
| 2004/0131860 A1 | 7/2004 | Tano et al. | |
| 2004/0152832 A1 | 8/2004 | Kirchmeyer et al. | |
| 2005/0231893 A1 | 10/2005 | Harvey | |
| 2006/0115717 A1 | 6/2006 | Schubert et al. | |
| 2006/0130300 A1 | 6/2006 | Kobayashi et al. | |
| 2006/0164790 A1 | 7/2006 | Takeuchi et al. | |
| 2006/0222952 A1 | 10/2006 | Kono et al. | |
| 2006/0274475 A1 | 12/2006 | Chiba | |
| 2007/0001651 A1 | 1/2007 | Harvey | |
| 2007/0015061 A1 | 1/2007 | Klaassen | |
| 2007/0022590 A1 | 2/2007 | Hirano et al. | |
| 2007/0076349 A1 | 4/2007 | Dementiev et al. | |
| 2007/0111093 A1 | 5/2007 | Kashiwagi et al. | |
| 2007/0218365 A1 | 9/2007 | Takezawa et al. | |
| 2007/0223178 A1 | 9/2007 | Fujino | |
| 2007/0224516 A1 | 9/2007 | Deguchi et al. | |
| 2007/0254221 A1 | 11/2007 | Lee et al. | |
| 2008/0003166 A1 | 1/2008 | Maletin et al. | |
| 2008/0013253 A1 | 1/2008 | Thrap et al. | |
| 2008/0013254 A1 | 1/2008 | Miller | |
| 2008/0028583 A1 | 2/2008 | Shimoyama et al. | |
| 2008/0044727 A1 | 2/2008 | Suzuki et al. | |
| 2008/0063931 A1 | 3/2008 | Zucker | |
| 2008/0089011 A1 | 4/2008 | Tasei et al. | |
| 2008/0111110 A1 * | 5/2008 | Ma | C09D 5/24 252/500 |
| 2008/0138696 A1 * | 6/2008 | Bartling | H01M 4/621 429/499 |
| 2008/0266754 A1 | 10/2008 | Kazaryan et al. | |
| 2009/0080141 A1 | 3/2009 | Eilertsen | |
| 2009/0109600 A1 | 4/2009 | Reddy et al. | |
| 2009/0134851 A1 | 5/2009 | Takeda et al. | |
| 2009/0141422 A1 | 6/2009 | Bourcier | |
| 2009/0279230 A1 | 11/2009 | Eilertsen et al. | |
| 2010/0002362 A1 | 1/2010 | Clelland et al. | |
| 2012/0033347 A1 * | 2/2012 | Eilertsen | H01G 9/016 361/502 |
| 2012/0156528 A1 | 6/2012 | Cooley | |
| 2013/0133923 A1 | 5/2013 | Leis et al. | |
| 2014/0002958 A1 | 1/2014 | Eilertsen | |
| 2015/0029639 A1 | 1/2015 | Eilertsen et al. | |

FOREIGN PATENT DOCUMENTS

| | | |
|---|---|---|
| JP | 1-310523 | 12/1989 |
| JP | 3-101211 | 4/1991 |
| JP | 03094412 A | 4/1991 |
| JP | 7-201675 | 8/1995 |
| JP | 7-240347 | 9/1995 |
| JP | 09298058 | 11/1997 |
| JP | 10294098 | 11/1998 |
| JP | 2000-277386 | 10/2000 |
| JP | 2000-331874 | 11/2000 |
| JP | 1-326145 | 11/2001 |
| JP | 2003-080679 | 3/2003 |
| JP | 2004111719 | 4/2004 |
| JP | 2005019795 | 1/2005 |
| JP | 2005-158609 | 6/2005 |
| JP | 2005518662 A | 6/2005 |
| JP | 2005-243455 | 8/2005 |
| JP | 6-121000 | 5/2006 |

(56) References Cited

FOREIGN PATENT DOCUMENTS

| JP | 2007-273738 | 10/2007 |
|---|---|---|
| JP | 2009503840 A | 1/2009 |
| JP | 2009-509808 | 3/2009 |
| KR | 1020080024859 | 3/2008 |
| WO | WO 99/24995 | 5/1999 |
| WO | 2005081336 | 9/2005 |
| WO | WO 2007/072815 | 6/2007 |
| WO | WO 2009/137752 | 11/2009 |
| WO | 2010025323 | 4/2010 |
| WO | WO 2010/039795 | 4/2010 |
| WO | WO 2010/121126 | 10/2010 |
| WO | WO 2015/006072 | 1/2015 |

OTHER PUBLICATIONS

English translation of JP2007277386A.*
Office Action for U.S. Appl. No. 12/229,922, mailed Nov. 15, 2011.
Office Action for U.S. Appl. No. 11/903,929, mailed on Jan. 7, 2010, 7 pages.
International Search Report and Written Opinion for International Application No. PCT/US2008/077460, mailed on Feb. 27, 2009, 8 pages.
International Preliminary Report on Patentability for International Application No. PCT/US2008/077460, issued on Mar. 30, 2010, 6 pages.
Office Action for U.S. Appl. No. 12/006,476, mailed on Nov. 18, 2009, 13 pages.
International Search Report and Written Opinion for International Application No. PCT/US2009/043259, mailed on Dec. 18, 2009, 9 pages.
International Search Report and Written Opinion for International Application No. PCT/US2009/055299, mailed on Apr. 1, 2010, 8 pages.
Supplementary European Search Report for European Application No. 09810631.3, mailed Jun. 5, 2015, with corrected version, 7 pages.
International Search Report and Written Opinion for International Application No. PCT/US2014/044585, mailed Oct. 14, 2014, 9 pages.

* cited by examiner

HIGH VOLTAGE EDLC CELL AND METHOD FOR THE MANUFACTURE THEREOF

CROSS REFERENCE TO RELATED CASES

This application claims priority to and is a national stage entry of PCT/US2009/055299, filed on Aug. 28, 2009, entitled "High Voltage EDLC Cell and Method for the Manufacture Thereof", which is a continuation-in-part of U.S. patent application Ser. No. 12/229,922, filed Aug. 28, 2008, entitled "High Voltage EDLC Cell and Method for the Manufacture Thereof", which is now U.S. Pat. No. 8,411,413, issued on Apr. 2, 2013, which is incorporated herein by reference in its entirety. This application is also related to U.S. patent application Ser. No. 12/151,811, which is now abandoned, filed May 8, 2008, "Electrode Structure for the Manufacture of an Electric Double Layer Capacitor"; which is incorporated herein by reference in its entirety.

BACKGROUND

The present invention relates to high voltage electrochemical double layer capacitors (EDLCs) and, more particularly, to a prototype design, manufacturing methods and materials to create electrodes for a high voltage EDLC, while maintaining high capacitance and low resistance thereof.

An electrochemical double layer capacitor (EDLC) is an energy storage device consisting of two electrodes arranged in such a manner that one acts as the cathode and the other the anode, creating a structure that can be modeled as two capacitors in series. The device is characterized by a high power density whose value can be dictated by the effective series resistance (ESR) of the device (i.e., the lower the ESR, the higher the power density). The capacitance of EDLCs can be large due to the effective surface of activated carbon used to fabricate an EDLC and the spacing between the electrode and the molecules of the electrolyte that form the double layers. The capacitance of an EDLC can be calculated using the formula $C=kA/d$, where k is a constant of proportionality, A is the effective surface area of the activated carbon, and d is the spacing between the electrode and the electrolyte molecules.

EDLC devices can be manufactured by encasing electrodes and separator material in a package which is wetted with electrolyte and sealed. The resulting device is a single cell EDLC device. These devices can be used in a wide variety of applications including but not limited to industrial power supplies, UPS (uninterrupted power supplies), electric vehicles, cell phones, and electronic appliances.

Known EDLCs operate with a nominal voltage rating of approximately 2.7 volts, a limitation imposed by virtue of the electrolyte. In some applications, more than a single EDLC cell is required to meet the needs of a particular application. For example, one or more EDLC devices can be coupled in series to provide a composite device that operates at a higher voltage. However, if the cells are not balanced as the number of cells in series increases premature failure of the composite device can occur. Additionally, the increase of the ESR of the cells in series can result in a decrease in power density.

SUMMARY

A method of manufacturing an electrode includes printing an electrode ink on a portion of a substrate using a rotary lithographic printer. The electrode ink is allowed to dry on the substrate. A separator material is printed on the portion of the substrate using the rotary lithographic printer. A sealant wall is printed around the portion of the substrate using the rotary lithographic printer.

DETAILED DESCRIPTION

Figure 1:
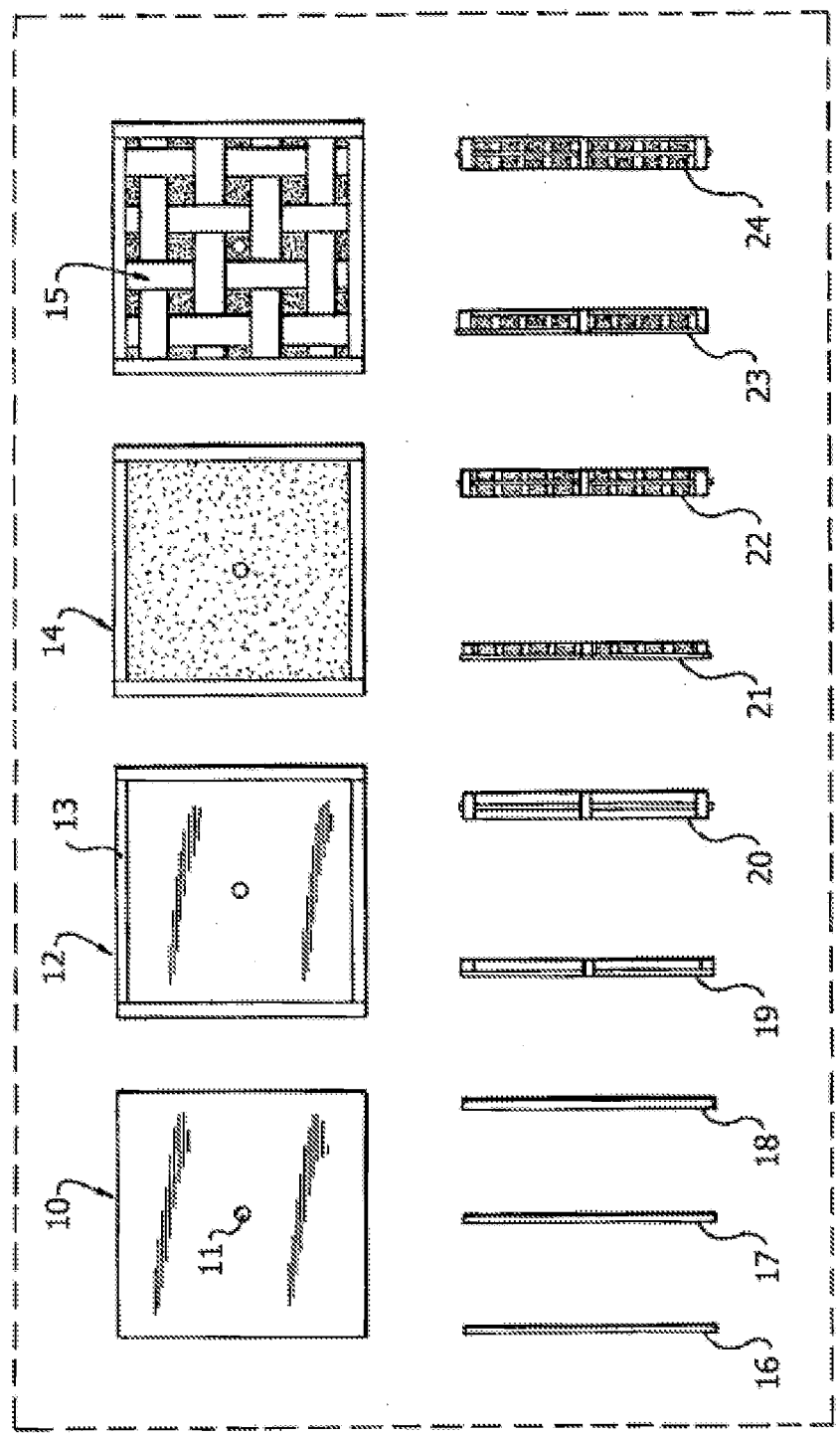
FIG. 1 shows the basic component shapes used in staging the various areas of the electrodes, according to an embodiment.

In some embodiments, a method of manufacturing an electrode includes printing an electrode ink on a portion of a substrate using a rotary lithographic printer. The electrode ink is allowed to dry on the substrate. A separator material is printed on the portion of the substrate using the rotary lithographic printer. A sealant wall is printed around the portion of the substrate using the rotary lithographic printer.

In some embodiments, a rotary lithographic printer can include a first rotating drum and a second rotating drum. A mesh is coupled to the first rotating drum. The electrode ink can be configured to be pressed onto the portion of the substrate through the mesh by the first rotating drum. Similarly, a separator material is configured to be pressed onto the substrate over at least a portion of the ink using the rotary lithographic printer.

In some embodiments, a method of manufacturing an electrode includes printing an electrode ink on a plurality of substantially similar shaped portions of a substrate such that the ink defines a pattern on the substrate. Each portion from the plurality of substantially similar shaped portions is mutually exclusive from the other portions from the plurality of substantially similar shaped portions. The electrode ink is allowed to dry on the substrate. A separator material is printed on top of at least one portion form the plurality of substantially similar shaped portions of the substrate.

Individual electrochemical cells have a finite voltage standoff due to the electrolyte's breakdown limit, which is generally in the range of 2.5-2.7 volts. In some embodiments, a manufacturing process allows a number of individual half-cells to be produced on a substrate, which can be folded with another substrate to produce a stack of low voltage cells connected in series. In some embodiments, such half-cells can be manufactured by lithographically printing electrode ink in a matrix of substantially similar shaped portions on the substrate. Similarly, a sealant wall can be printed around the similar shaped portions and a separator material can be printed on the electrode ink. The voltage stand off depends on the number of such cells within each stack and eliminates cell balancing issues.

In some embodiments, a single cell composite device is designed to use a large number of individual cells in a single package, thus producing a "single cell" EDLC device with a higher voltage standoff than that of conventional EDLCs. Such EDLCs can be lighter in weight, smaller in volume, and inherently free of complications that arise from cell balancing. The EDLC has a unit cell structure with alternately interleaved electrodes formed lithographically and a preformed separator disposed between the electrodes, also formed lithographically. An electrolyte is impregnated an within the EDLC. The electrodes can be lithographically printed at precise intervals on a substrate referred to as a half-cell strip. On a first pass of the printing process an array of square or rectangular areas are defined and electrode ink is printed on the substrate. The printing process allows for varying the thickness of the carbon layer and this influences the overall energy density of the half-cell strip. On a second pass a border of sealant material is formed around each electrode. On a third pass a separator material is printed on half of the half-cell strips. The strips are then joined forming a completed EDLC cell. Extensions of individual stacks of electrodes are also provided, containing additive capacitance, interfaced by allowing extra lengths of current collector to one of the electrodes and continuing forward with component placement or by sonic welding or by heat (spot) welding the extension pieces together.

Some embodiments include manufacturing steps for a single high voltage EDLC cell. An example capacitance of 58 farads and a voltage standoff of 15 volts is used hereinbelow. It is not intended that this example be taken as a standard; rather, it should be understood this is an arbitrary choice to illustrate the concept. The methodology may be extended to virtually any other capacitance and voltage stack.

FIG. 1 illustrates an electrode (e.g., a half-cell) throughout various stages of the manufacturing process. Plan views of the manufacturing stages of the electrode are identified by reference numerals 10, 11, 12, 13, 14 and 15, shown on the upper portion of FIG. 1, while the respective cross-sectional thickness of single and double layer electrodes are identified by reference numerals 16, 17, 18, 19, 20, 21, 22, 23 and 24, shown on the lower portion of FIG. 1.

A current collector (e.g., a substrate) 10, 16 can be constructed of any suitable material. For example, in some embodiments, the current collector 10, 16 is constructed of capacitor grade aluminum (e.g., 99.99% pure aluminum). In other embodiments, the current collector can be constructed of tantalum and/or the like. The current collectors 10, 16 can be available in sheets. In some embodiments, for example, a sheet can have a thickness of 30 µm, a width of 50 mm and a length of 50 mm. In other embodiments, the sheets can be any suitable size. For example, in other embodiments the sheet can have a thickness of 40 µm. The substrate material can be obtained in large rolls and can be slit to appropriate dimensions for the fabrication of a particular device. In some embodiments, stationary knives are used to slit the substrate material to the appropriate dimensions. Such stationary knives can be used to make a clean accurate cut that does not cause rolled edges on the substrate. The process, as mentioned above, can be used for virtually any size capacitor and the device capacitance is dependent upon the size of the half-cell structures, described in further detail herein.

In some embodiments, the current collector 10, 16 can be cleaned. Such cleaning can help prevent the current collector from forming contaminates that can reduce the strength of the bond between the electrode material and the current collector 10, 16 when the electrode material is formed on the current collector 10, 16, as further described in detail herein. For example, aluminum, when exposed to an oxygen atmosphere, can quickly form contaminates (e.g., aluminum oxide) that can impede the electrode material from bonding with an aluminum current collector. In some embodiments, plasma etching can be used to clean the current collector 10, 16. In such embodiments, plasma etching can be used as part of a printing process, as described in further detail herein. As such, an apparatus (such as apparatus 50 shown in FIG. 1A) can plasma etch the current collector 10, 16 prior to printing the electrode ink on the current collector 10, 16. In other embodiments, high voltage corona discharge can be used to clean the current collector 10, 16. In still other embodiments, chemical etchant baths can be used to remove such contaminates. In such embodiments, the electrode material can be printed on the current collector soon after the current collector is removed from the bath since an oxide layer can reform on an aluminum current collector in a matter of minutes.

A hole 11 is formed in the current collector 10, 16. The hole 11 can be formed using any suitable technique. In some embodiments, for example, the hole 11 can be drilled, cut, and/or the like. The hole 11 can be aligned with the holes formed in other current collectors. An electrolyte can be inserted into a stack of cells via the holes, as described in further detail herein.

A sealant material 12 is formed around the perimeter of the current collector 13. The sealant material 12 creates a sealant wall that will surround the carbonized material, as described in further detail herein. The sealant material 12 can be a polymer configured to adhere to the sealant material on another current collector 13 to form a hermetically sealed barrier between the cell and the external atmosphere. In such a manner, two half-cells are combined to make a full cell. In some embodiments, a polyvinylidene fluoride (PVDF) material, such as, for example, Solef 1008 manufactured by Solvay-Solexis, can be used. Such a material can include desired properties such as operating temperature, surface adhesion, flexibility, and chemical solubility. In other embodiments, a CL-5-1 sealant material can be used. In some embodiments, the sealant material 12 can have a thickness of less than 100 µm for a single side 19 and less than 170 µm for a double sided component 20 (e.g., when the sealant material 12 is printed on both sides of the current collector 13). The application of the sealant material can be through a lamination process, screen printing and/or lithographic printing, as further described herein. The sealant material 12 forms a wall around the perimeter of the current collector 13 that is immune to decay from electrolyte exposure and prevents leakage of electrolyte from the cell.

In some embodiments, the portion of the current collector on which the sealant material is formed can be perforated with micro holes such that the sealant material formed on a first surface of the current collector can be coupled with the sealant material formed on a second surface of the current collector. In such embodiments, for example, the sealant material on the first surface of the current collector can be monolithically formed and/or fused with the sealant material on the second surface of the current collector. This can help stabilize the wall created by the sealant material on both surfaces of the current collector.

An electrode ink is applied to the current collector 14. A side view 21 of the current collector 14 having electrode ink applied on a single side of the current collector 14 and a side view 22 of the current collector 14 having electrode ink applied to both sides of the current collector 14 are shown in FIG. 1. The electrode ink can be any suitable electrode ink. In some embodiments, for example, the electrode ink can be a carbon slurry similar to that described in U.S. patent application Ser. No. 12/151,811, filed May 8, 2008, entitled "Electrode Structure for the Manufacture of an Electric Double Layer Capacitor," which is incorporated herein by reference in its entirety. The electrode ink can be composed primarily of activated carbon (e.g., MSP-20), smaller quantities of conductive carbon (e.g., Super P), rubberizers (e.g., BM-400-B), binders (e.g., polytetrafluoroethylene (PTFE), polyvinylpyrrolidone (PVP)), fillers (e.g., Cab-o-Sil), distilled water and/or other additives (e.g., carboxymethyl cellulose (CMC)). In some embodiments the electrode ink can be formed by mixing proper proportions of the ingredients in specific a order, half mixing with itself and with a solvent. Once mixed, the electrode ink can be applied to the current collector (e.g., substrate). The electrode ink mixture has enhanced electrical properties that reduce the bonding resistance and increase the capacitance of the electrode ink promoting a unique cast component solution. In other embodiments, the electrode ink can include ceramics and/or the like.

Activated carbon, the predominant ingredient in an EDLC carbon electrode, provides massive exposed surface areas used to create the capacitive storage in high voltage EDLC applications. The capacitance of a cell is proportional to the volume of the activated carbon within the cell. In some embodiments, a specific value can be obtained by taking the product of the cell volume times the specific capacitance per unit volume with the latter being relatively constant up to a moderate thickness. In other embodiments, the capacitance can be obtained using the specific capacitance per unit area times the area of a cell. As discussed in further detail herein, arranging multiple cells in series and parallel can reduce the ESR of the electrode and thus increase the power density of the electrode. Such an arrangement can also increase the current carrying capability of the device.

Differing applications dictate the relative importance of power vs. energy density. The manufacturing process may be adjusted to prioritize either. In some embodiments, for example, the thickness of the electrode ink on the current collector and the adhesive thickness of the sealant material on the current collector can be increased to increase the energy provided by the cell. As further described in detail herein, the thickness of the electrode ink on the current collector can be varied by a thickness of a screen (e.g., a mesh) used in a lithographic printing process. As mentioned above controlling the thickness in turn changes the energy density of the individual half-cells.

In order to maximize the working voltage of the EDLC device, a proton conductor or separator 15 can be disposed between individual polarized half-cells in order to electrically isolate but not chemically separate the half-cells. The separator 15 can also be configured such that only specific charged ions can pass through the separator 15. The separator 15 can also store a limited amount of free electrolyte not absorbed into the activated carbon. The separator 15 can be inserted or printed on one of the half-cell strips using lithographic techniques, described in further detail herein.

The separator 15 undergoes high mechanical stress, both in vertical and horizontal directions, as the EDLC is charged and discharged in operation. The separator 15 adds its own resistive quantities measured as a constant in one direction or the opposite direction, and as some reactive component as a frequency dependent quantity. In some embodiments, a lithographic printing process can be used to print the separator material onto the electrode ink, since precession location, material concentration, spacing, sizing and adaptability are important parameters and may be more easily attained using a lithographic printing process.

In some embodiments, the separator 15 can be constructed of a polyvinylidene fluoride (PVDF), such as, for example, Solef 6020 manufactured by Solvay-Solexis. In other embodiments, the separator can be constructed of rubberizers (e.g., BM-440-B), binders (e.g., polytetrafluoroethylene (PTFE), polyvinylpyrrolidone (PVP)), fillers (e.g., cab-o-sil), distilled water and/or other additives. In such embodiments, the cab-o-sil forms a permeable membrane configured to allow electrolyte ions to pass through the separator material.

The separator 15 can be screen and/or lithographically printed onto the prepared, dried electrode ink, as described in further detail herein. In some embodiments, for example, the separator 15 can have a maximum applied thickness of 25 µm, a pore size of 25 to 50 µm with an evenly distributed pore size distribution (PSD) and a homogenous separator matrix composition. The pore size can dictate the rate of electrolyte migration in the cells. A small pour size, for example, can reduce the rate of electrolyte migration in the cells which can slow the response of the capacitor. Depending on the power or energy requirements of the final high voltage EDLC, the screening application process can compensate for other material or manufactured defects. A single sided electrode 23 with a screened separator and a double-sided electrode 24 (e.g., a half-cell printed on both surfaces of a current collector) with screened separator are shown in FIG. 1. In some embodiments, the separator can be as thin as possible to provide sufficient isolation to prevent the two half-cells from shorting together. In some embodiments, only one separator 15 is required between each half-cell assembly, so alternate placement from the screening applicator may be possible. Accordingly, as described in further detail herein, a separator 15 is not printed on every current collector. After a completed half-cell is printed on a first surface of the current collector, a half-cell can be printed on a second surface of the current collector using a similar process.

In other embodiments, the separator can be placed onto the prepared, dried electrode ink using methods other than printing. For example, a premade separator sheet can be placed and/or laminated onto the dried electrode ink. Some separator materials used in such embodiments operate best when formed prior to being placed onto the dry electrode ink. Such materials are available from manufactures such as Celgard and NKK. The operation parameters of such separator materials can be predefined and tested by the manufacturer and, as such, the materials can operate as tested under various conditions. Such separators can be physically applied to the current collector over the electrode ink as the electrodes are manufactured or such separators can be laminated prior to assembly of the electrode.

Figure 1A:
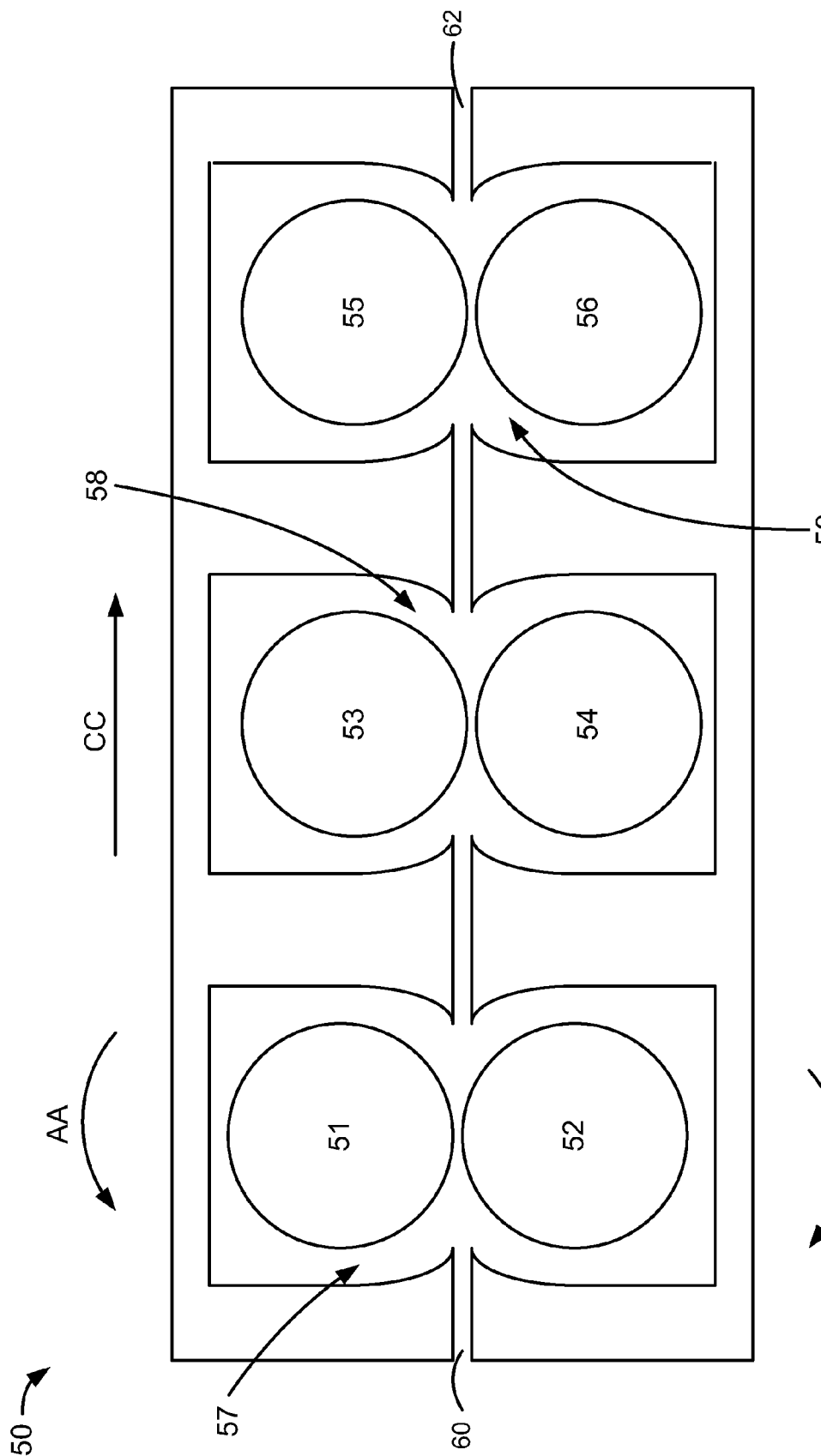
FIG. 1A is a schematic illustration of a rotary lithographic printer, according to an embodiment.
Figure 1B:
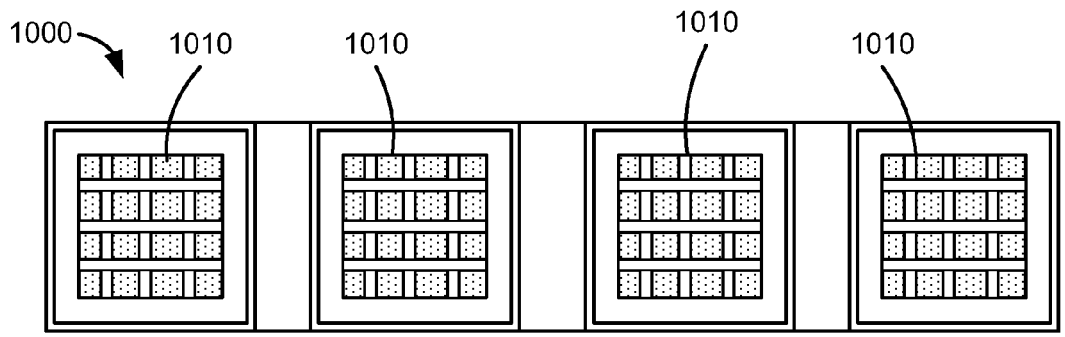
FIGS. 1B-1D are schematic illustrations of various electrode arrays printed using the rotary lithographic printer of FIG. 1A.
Figure 1C:
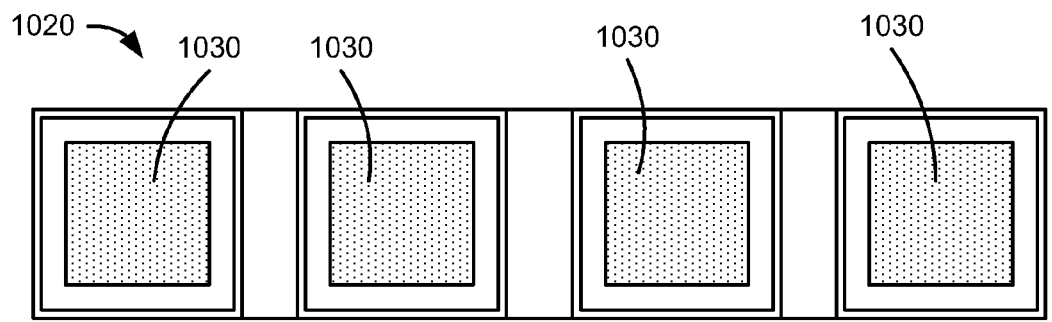
Figure 1D:
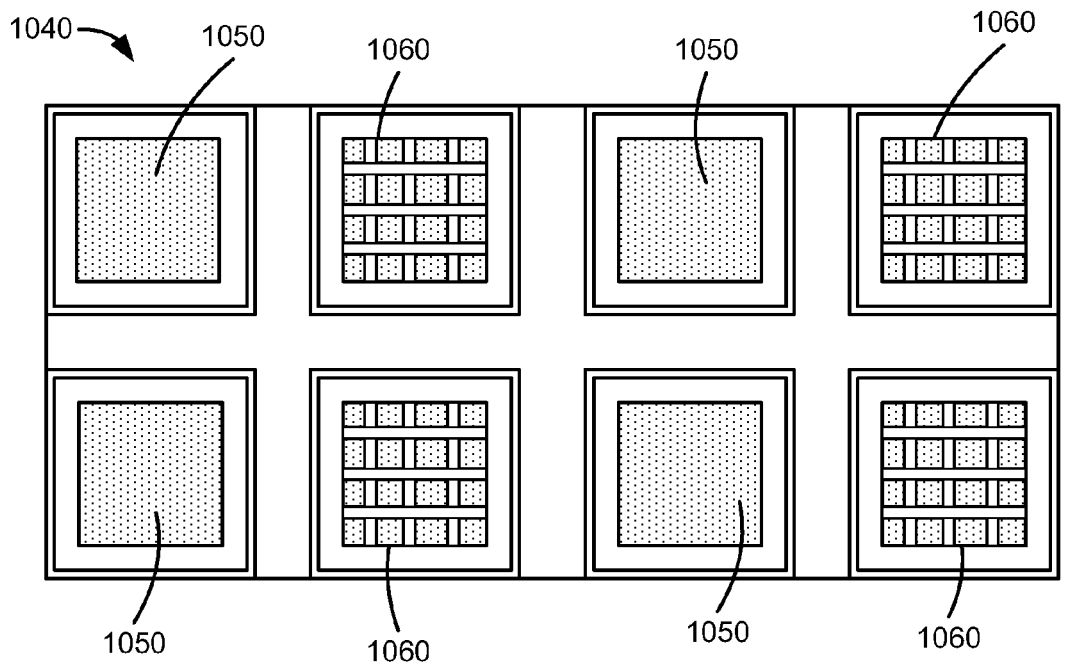

FIG. 1A is a schematic illustration of a rotary lithographic printer 50 used to manufacture an electrode, such as the half-cells shown and described in FIGS. 1B-1D, according to an embodiment. The rotary lithographic printer 50 includes a first pair of rotating drums 57, a second pair of rotating drums 58 and a third pair of rotating drums 59. The first pair of rotating drums 57 includes a top drum 51 and a bottom drum 52. The top drum 51 is a print head containing electrode ink. In some embodiments, an outer mesh layer (not shown in FIG. 1A) is coupled to the top drum 51. The top drum is configured to press the electrode ink through the outer mesh layer and onto a current collector (e.g., a substrate) when the current collector is passed between the top drum 51 and the bottom drum 52.

The top drum 51 is configured to rotate about a center axis in the direction shown by the arrow AA in FIG. 1A. Similarly, the bottom drum 52 is configured to rotate about a center axis in the direction shown by the arrow BB in FIG. 1A. Accordingly, when a substrate is passed between the top drum 51 and the bottom drum 52, the substrate is moved in a direction shown by the arrow CC in FIG. 1A. This allows the top drum 51 to print the electrode ink onto the substrate as the substrate is moved in the direction shown by the arrow CC.

In some embodiments, the top drum 51 prints the electrode ink in a pattern across the substrate. In such embodiments, for example, the top drum 51 can print an array of rectangles across a long strip of substrate. Such an array of rectangles can be similar to those shown in FIGS. 1B-1D. In other embodiments, any other pattern can be printed, such as, for example, a pattern of triangles, circles, ovals and/or the like.

The thickness of the electrode ink printed onto the substrate can be varied by varying the outer mesh layer coupled to the top drum 51. For example, if a thicker layer of electrode ink is desired, the thickness of the outer mesh layer can be increased. Further, if a thinner layer of electrode ink is desired, the thickness of the outer mesh layer can be decreased. Varying the thickness of the electrode ink varies the capacitance of the device. An optimal thickness of the electrode ink can be determined by printing samples and measuring the capacitance per unit volume of the samples. If the electrode ink is too thick, the electrode ink spaced far from the current collector does not function as intended and can reduce the migration of electrolyte ions and thus the conduction rate across the separator layer. If the electrode ink is too thin, the capacitance of the device can be less than the capacitance of an electrode having electrode ink layer with optimal thickness.

Similar to the first pair of rotating drums 57, the second pair of rotating drums 58 includes a top drum 53 and a bottom drum 54. The top drum 53 is configured to rotate about a center axis in the direction shown by the arrow AA in FIG. 1A. Similarly, the bottom drum 54 is configured to rotate about a center axis in the direction shown by the arrow BB in FIG. 1A. Accordingly, when a substrate is passed between the top drum 53 and the bottom drum 54, the substrate is moved in a direction shown by the arrow CC in FIG. 1A.

The top drum 53 is a print head containing separator material. In some embodiments, an outer mesh layer (not shown in FIG. 1A) is coupled to the top drum 53. The top drum 53 is configured to press the separator material through the outer mesh layer and onto a substrate on which electrode ink has been printed when the substrate is passed between the top drum 53 and the bottom drum 54.

In some embodiments, the top drum 53 prints the separator material onto the substrate in a pattern across the electrode ink. In such embodiments, for example, the top drum 51 can print an array of rectangular strips across a portion of a substrate on which electrode ink has been printed. Such an array of rectangular strips can be similar to those shown in FIGS. 1B and 1D. In other embodiments, any other pattern can be printed.

As discussed above, in some embodiments, the separator material is not printed on every current collector. For example, FIG. 1C shows a strip of substrate 1020 with half-cells 1030 on which separator material is not printed. To achieve such a result, the top drum 53 can be configured to print the separator material on some current collectors and not others.

Similar to the first pair of rotating drums 57 and the second pair of rotating drums 59, the third pair of rotating drums 59 includes a top drum 55 and a bottom drum 56. The top drum 55 and the bottom drum 56 are configured to rotate similar to the top drum 51 and the bottom drum 52, described above. The top drum 55 is a print head containing sealant material. In some embodiments, an outer mesh layer (not shown in FIG. 1A) is coupled to the top drum 55. The top drum 55 is configured to press the sealant material through the outer mesh layer and onto a substrate when the substrate is passed between the top drum 53 and the bottom drum 54. The sealant material can be printed such that sealant material surrounds the portion of the substrate on which the electrode ink is printed.

In use, a piece of substrate material (e.g., aluminum) is inserted into the apparatus 50 at point 60. Because of the rotational motion of the rotating drum pairs 57, 58, 59, the substrate material is moved in the direction shown by the arrow CC. As the substrate material passes through the first pair of rotating drums 57, the top rotating drum 51 prints electrode ink on the substrate. As discussed above, in some embodiments, the top rotating drum 51 can print a pattern of electrode ink on the substrate, such as, for example, an array of rectangles.

The piece of substrate material then passes from the first pair of rotating drums 57 to the second pair of rotating drums 58. The distance between the first pair of rotating drums 57 and the second pair of rotating drums 58 can be large enough to allow the electrode ink printed on the substrate by the first pair of rotating drums 57 to dry on the substrate before the substrate reaches the second pair of rotating drums 58. In other embodiments, the electrode ink need not be dried prior to printing the separator material on the substrate. After the substrate contacts the second pair of rotating drums 58, the top rotating drum 53 prints the separator material on the substrate in the desired pattern and location. In some embodiments, for example, the separator material is printed on only some of the half-cells. The piece of substrate material then passes from the second pair of rotating drums 58 to the third pair of rotating drums 59. The top rotating drum 55 prints the sealant material around the perimeters of the portions of the substrate on which the electrode ink was printed.

The printed substrate (e.g., completed half-cell strip) can then exit the apparatus at point 62. The piece of substrate material can then be turned over and inserted through the apparatus 50 such that the electrode ink, the sealant material and optionally, the separator material is printed on a second surface of the substrate. The positioning of the components already printed on the first surface of the substrate (e.g., the electrode ink, the separator material and the sealant material) as the components are printed onto the second surface of the substrate can be monitored using optical sensors (not shown) positioned on the apparatus 50. Such optical sensors can help ensure that the half-cells printed on the second surface of the substrate are aligned with the half-cells printed on the first surface of the substrate. In other embodiments, any other suitable method and/or device is used to monitor the positioning of the components already printed on the first surface of the substrate as the components are printed onto the second surface of the substrate. In still other embodiments, half-cells are printed on the second surface of the substrate by the bottom rotating drums as the top rotating drums print the half-cells on the first surface of the substrate. In such embodiments, only a single pass through the apparatus 50 is necessary to print half-cells on both sides of the substrate.

In some embodiments, as each component (e.g., the electrode ink, the separator material and the sealant material) is applied, drying time can be modified (e.g., longer or shorter), as the substrate is wound onto a large round drum that may be oil heated to maintain a satisfactory drying temperature. The large drum may also be considered a storage vehicle to allow more substrate material in a smaller length of area and not condensing it into a compact reel thus possibly damaging the integrity of the sealant material and electrode ink.

While shown in FIG. 1A as printing the sealant material onto the substrate after printing the electrode ink and the separator onto the substrate, the sealant material can be printed onto the substrate at any point in the printing process. In some embodiments, for example, the sealant material is printed onto the substrate prior to printing the electrode ink and the sealant material onto the substrate. In other embodiments, the sealant material is printed onto the substrate after printing the electrode ink onto the substrate but prior to printing the sealant material onto the substrate.

While shown in FIG. 1A as having three rotating drum pairs 57, 58, 59, in other embodiments the apparatus can include a single rotating drum pair. In such embodiments, the top rotating drum can be reconfigured at each stage of the printing process. For example, the top rotating drum can first be configured to print the electrode ink on the substrate. The substrate can then be passed between the rotating drum pair and the electrode ink can be printed on the substrate. The top rotating drum can then be reconfigured to print the separator material on the substrate and the substrate can be passed between the rotating drum pair a second time such that the separator material is printed on the substrate. The top rotating drum can then be reconfigured to print the sealant material on the substrate and the substrate can be passed between the rotating drum pair a third time such that the sealant material is printed on the substrate.

FIGS. 1B-1D show examples of half-cell strips printed using the apparatus 50 of FIG. 1A. FIG. 1B, for example, shows a substrate 1000 with four half-cells 1010 printed thereon. The electrode ink, the separator material and the sealant material is printed on each of the four half-cells 1010. FIG. 1C shows a substrate 1020 with four half-cells 1030 printed thereon. The separator material is not printed on the four half-cells 1030 of substrate 1020. As described in further detail herein, the substrate 1000 can be coupled with the substrate 1020 to form multiple electrode cells connected in series.

Figure 3:
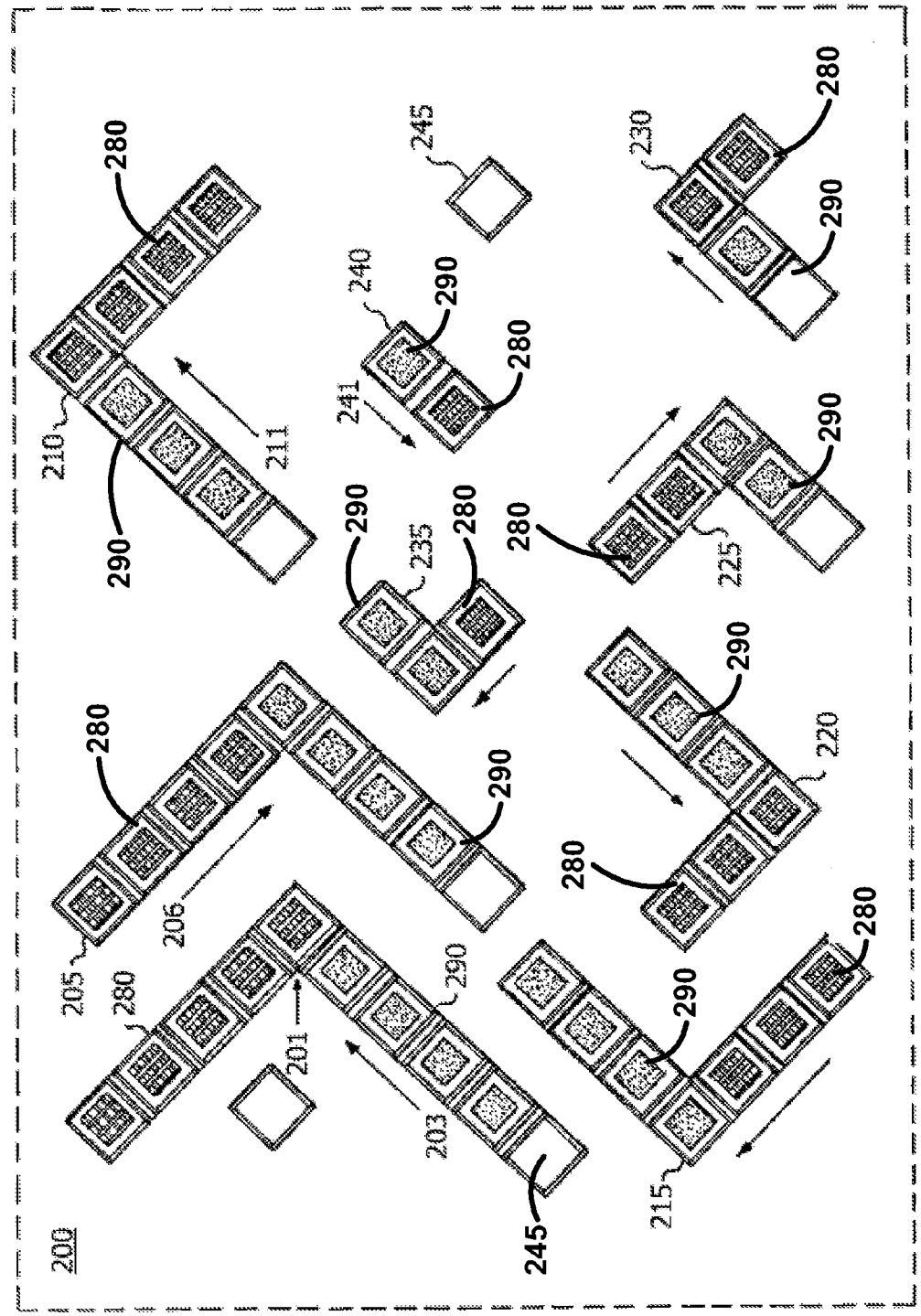
FIG. 3 illustrates the folding organization patterns used to complete each cell sequentially, according to an embodiment.

While FIGS. 1B and 1C show a single row of half-cells printed on a substrate, FIG. 1D shows a substrate 1040 having two rows of half-cells 1050, 1060 printed thereon. The separator material is printed on some half-cells 1060 while not printed on other half-cells 1050. In some embodiments, the substrate 1040 can be folded to provide a series connection between the electrodes in each row and a parallel connection between the electrodes in the two rows. In other embodiments, any number of rows and columns of any number of half-cells can be printed on the substrate. For example, FIG. 3 shows two substrates having five half-cells each.

Figure 1E:
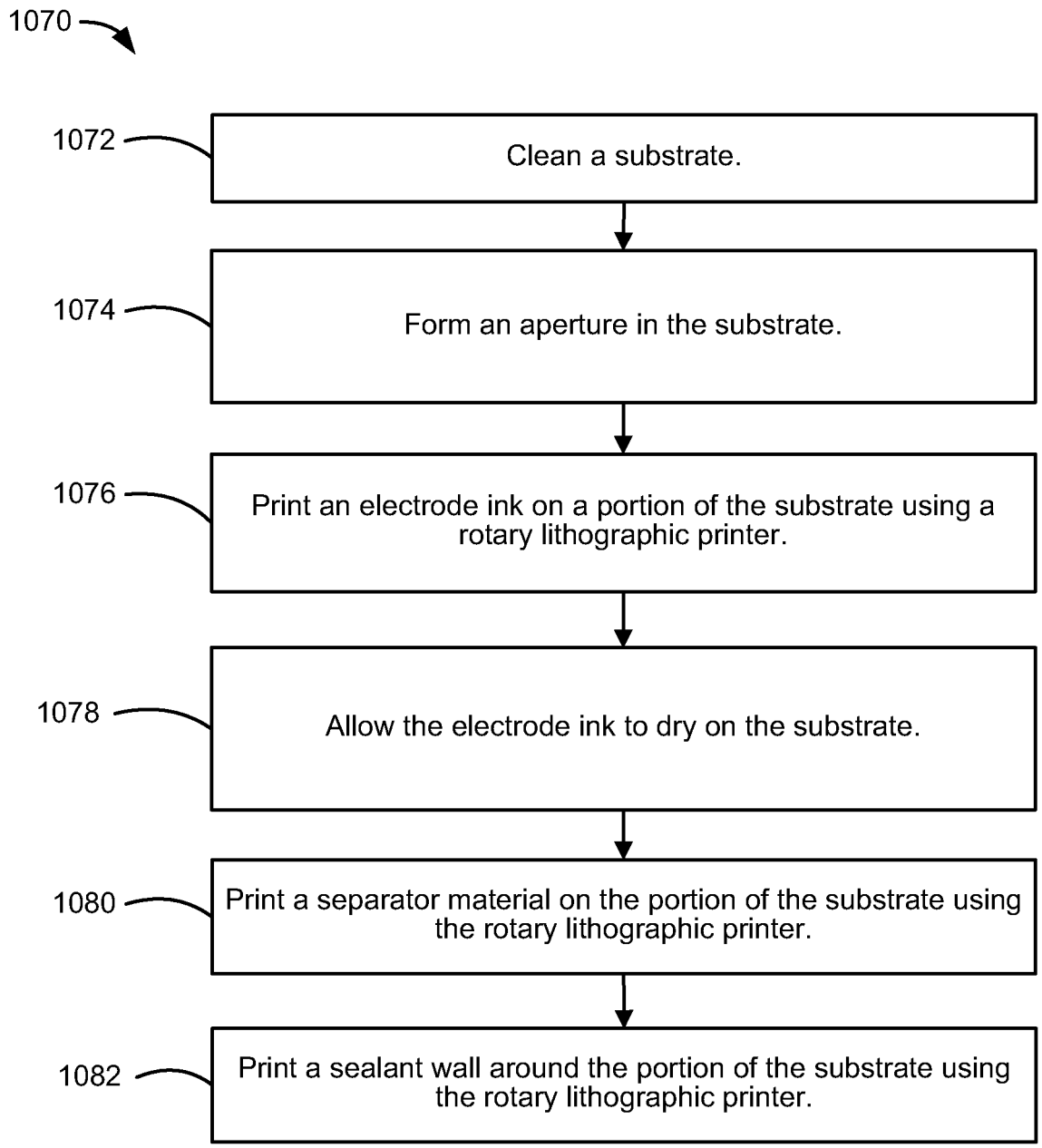
FIG. 1E is a flow chart illustrating a method of printing an electrode, according to an embodiment.

FIG. 1E is a flow chart illustrating a method 1070 of printing half-cells of an electrode on a substrate. The method includes cleaning the substrate, at 1072. The substrate can be cleaned by, for example, plasma etching. Such cleaning can help prevent the current collector from forming contaminates that can reduce the strength of the bond between the electrode material and the current collector when the electrode material is printed on the current collector.

An aperture is formed in the substrate, at 1074. As discussed above, the aperture can be formed by any suitable method and electrolyte can be inserted into the aperture when the device is completed, as described in further detail below. An electrode ink is printed onto a portion of the substrate using a rotary lithographic printer, at 1076. The electrode ink can include activated carbon and can be similar to the electrode ink shown and described above. Further, the rotary lithographic printer can be similar to the apparatus 50 shown and described with relation to FIG. 1A.

The electrode ink is allowed to dry on the substrate, at 1078. A separator material is printed onto the portion of the substrate using the rotary lithographic printer, at 1080. The separator material can be similar to the separator material shown and described above. Moreover, the separator material can be printed onto the portion of the substrate in a specific pattern, such as, for example, the checkered pattern shown on the half-cells 1010 of substrate 1000 in FIG. 1B. A sealant wall is printed around the portion of the substrate using the rotary lithographic printer, at 1082. The sealant wall can be used to hermetically seal the half-cell with another half-cell to create a completed full cell.

Figure 2:
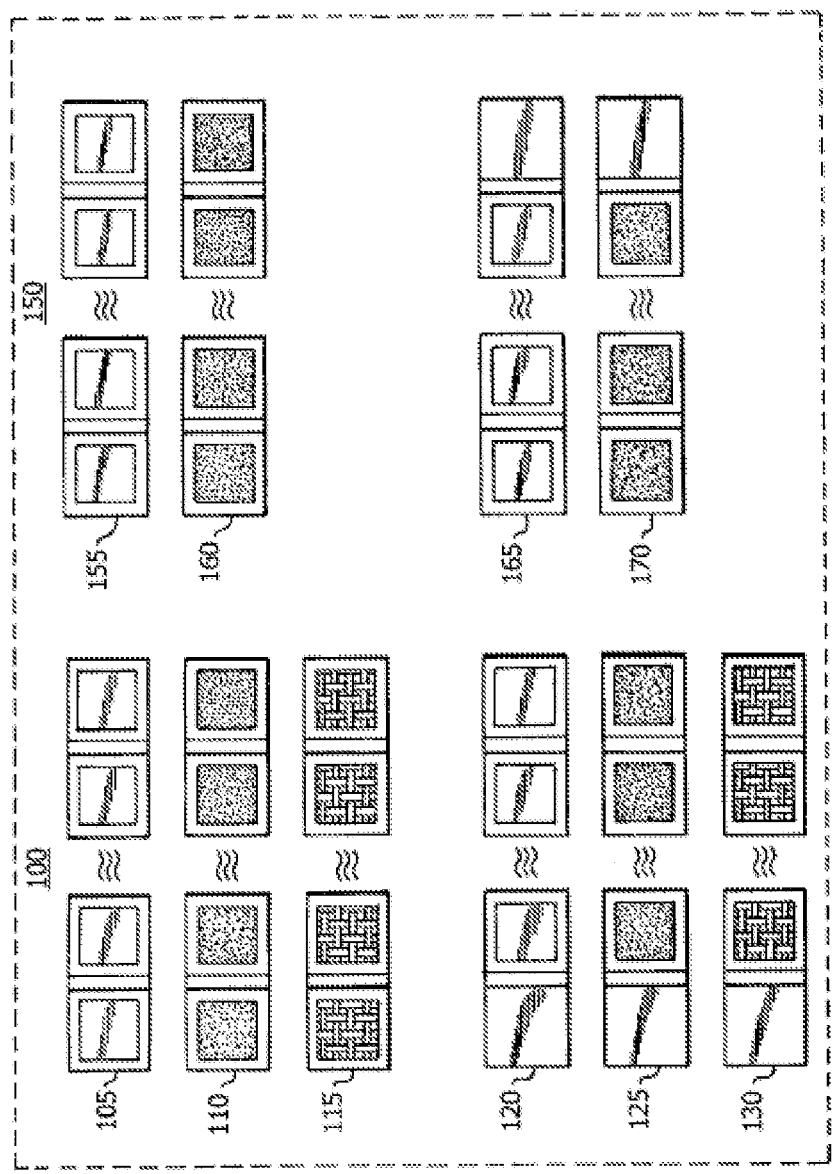
FIG. 2 shows a component selection and specific placement thereof, according to an embodiment.

FIG. 2 details lithographic component plates, showing front 105, 110, 115 and back 120, 125, 130 sides of a first substrate 100 and front 155, 160 and back 165, 170 sides of a second substrate 150 at different stages within the printing process. Each component of the printing process (e.g., the electrode ink, the separator material and the sealant material) is sequentially applied onto the substrates 100, 150 until the components are completed. The components can be applied to each side of the substrates 100, 150 as described above. As shown in FIG. 2, the separator material is not applied to the second substrate 150.

Detailed information as to how the electrode components are assembled into the high voltage EDLC are referenced initially by the sample 90 degree lithographic component folding scheme shown in FIG. 3. A first half-cell strip 280 comprises elements 115 and 130 (FIG. 2) and a second half-cell strip 290 comprises elements 160 and 170 (FIG. 2) arranged 90 degrees offset from each other 200, both half-cell strips 280, 290 having the respective front sides facing up. A separator material is printed on the half-cells of the first half-cell strip 280 while a separator material is not printed on the half-cells of the second half-cell strip 290. As the half-cells of the first half-cell strip 280 are coupled to the half-cells of the second half-cell strip 290, each full cell will have a separator material between the electrode ink.

The folding pattern demonstrates how individual components are aligned. Beginning with folding pattern 200 of half-cell strip 280, the first bottom component 201 has bare aluminum ready for block assembly, described in further detail herein. Initially half-cell strip 290 slides down on top of half-cell strip 280 forming the first full cell component. The half-cell strip 290 is then folded over the half-cell strip 280 in the direction shown by the arrow 206, at 205. This fold forms a second full cell component. The half-cell strip 290 is then folded over the half-cell strip 280 in the direction shown by the arrow 211, at 210. This fold forms a third full cell component. This folding process is repeated at steps 215, 220, 225, 230 and 235 until the last folding pattern 240, folds the half-cell strip 290 over the half-cell strip 280 in the direction shown by the arrow 241 and the operation is complete with the top end component 245 of half-cell strip 290 on top of the additive capacitive block. Such a folding process produces a stack of multiple full cells connected to each other in series. For example, in FIG. 3, the folding process results in a stack of nine full cells connected in series.

As each of these electrode assemblies is built, it is targeted for specific sections, being defined as block and block interface coupling areas. The most straightforward is the block area. In this area, the two electrodes are intertwined, coupling the carbon-to-carbon interface together with only one thin separator sandwiched between them. As each electrode is advanced, it is folded 90 degrees to the second electrode with each electrode being placed down in series to the other. Every second time an electrode is placed down, an additive capacitive component is created. As long as each electrode is interfacing in this series fashion with continuous lengths of current collector matching, the capacitance is additive.

At the beginning of the electrode, a carbon mass-free aluminum current collector component is provided (e.g., bottom component 201 in FIG. 3). This also occurs at the very end of the completed EDLC block (e.g., component 245 in FIG. 3). These bare aluminum segments, at least on one side, when the EDLC is first connected to a positive and negative power source, act as the terminal interface.

Figure 3A:
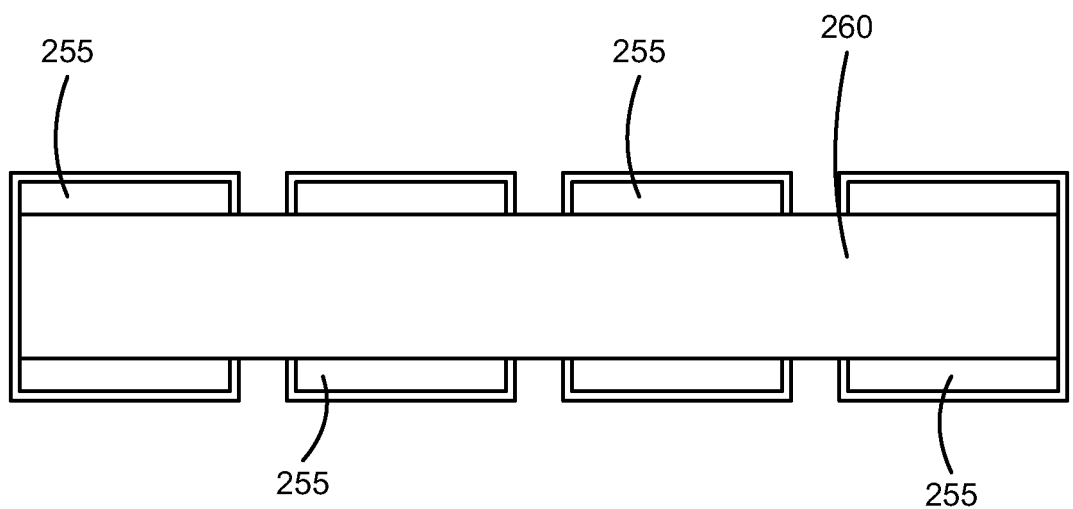
FIG. 3A is a schematic illustration of three stacks of electrodes connected in parallel, according to an embodiment.

A stack produced by the folding process 200 of FIG. 3 can be coupled to other similar stacks in parallel. For example, FIG. 3A shows four stacks 255 coupled to each other in parallel by a conductor 260 (e.g., a piece of aluminum). Specifically, the conductor 260 is coupled to the top bare component (e.g., component 245 in FIG. 3) of each of the stacks 255. Similarly, the bottom bare component (e.g., component 201) of each of the four stacks 255 is coupled to the bottom bare component of the other stacks by a conductor (not shown in FIG. 3A). Such a series/parallel configuration (e.g., cells coupled in series within each stack and cells coupled in parallel between each stack) can increase the power density of the device. Such configurations reduce the ESR and thus increase the power density and provide a device having a more robust current carrying capability than a single stack of cells.

Depending on the structural size and organization of these component areas, orienting length, width and thickness in parallel and/or series compartments provides greater capacitance and/or voltage standoff capability, respectively. To illustrate suppose multiple half-cell strips have been joined forming an EDLC device with n individual cells in series (e.g., the number of cells in each stack 255) and m in stacks in parallel (e.g., the number of stacks 255). The capacitance of each stack can be equal to the capacitance of each cell divided by the number of cells in each stack ($C_{stack}=C_{cell}/n$). The voltage standoff of each stack can be equal to 2.5 times the number of cells in each stack ($V_{standoff}=2.5 \times n$). The capacitance of the device can be equal to the number of stacks times the capacitance of each cell divided by the number of cells in each stack ($C_{total}=(m \times C_{cell})/n$). The ESR of such a device can be the ESR of each stack divided by the number of stacks ($ESR_{total}=ESR_{strip}/m$).

Figure 4:
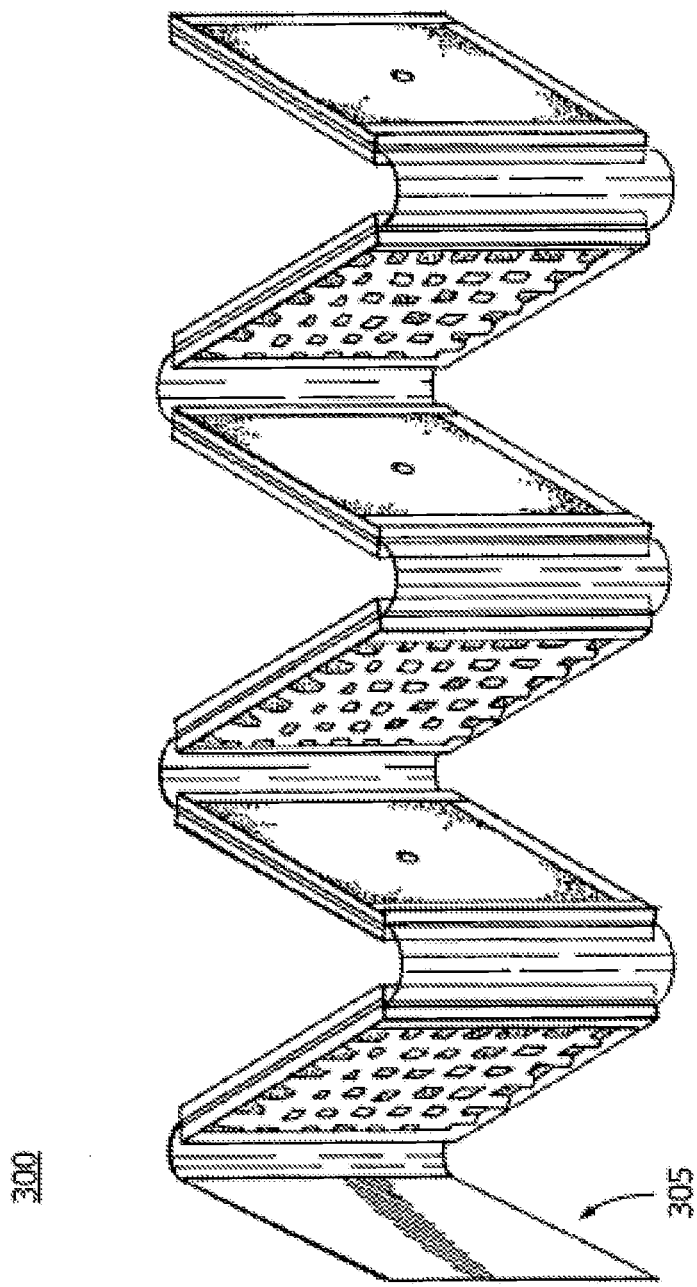
FIG. 4 shows an open view of one electrode, the component patterns being shown in sequence from front to back side, indicating how they appear when folded, according to an embodiment.

FIG. 4 shows a single electrode capacitive segment folding view 300, indicating layer detail. One side of the segment is free from material including components 305 or both sides, depending on the application and desired termination method. Considering only one electrode side exposed, the other side may have components consisting of carbon mixture only or an additional component such as the separator.

Figure 5:
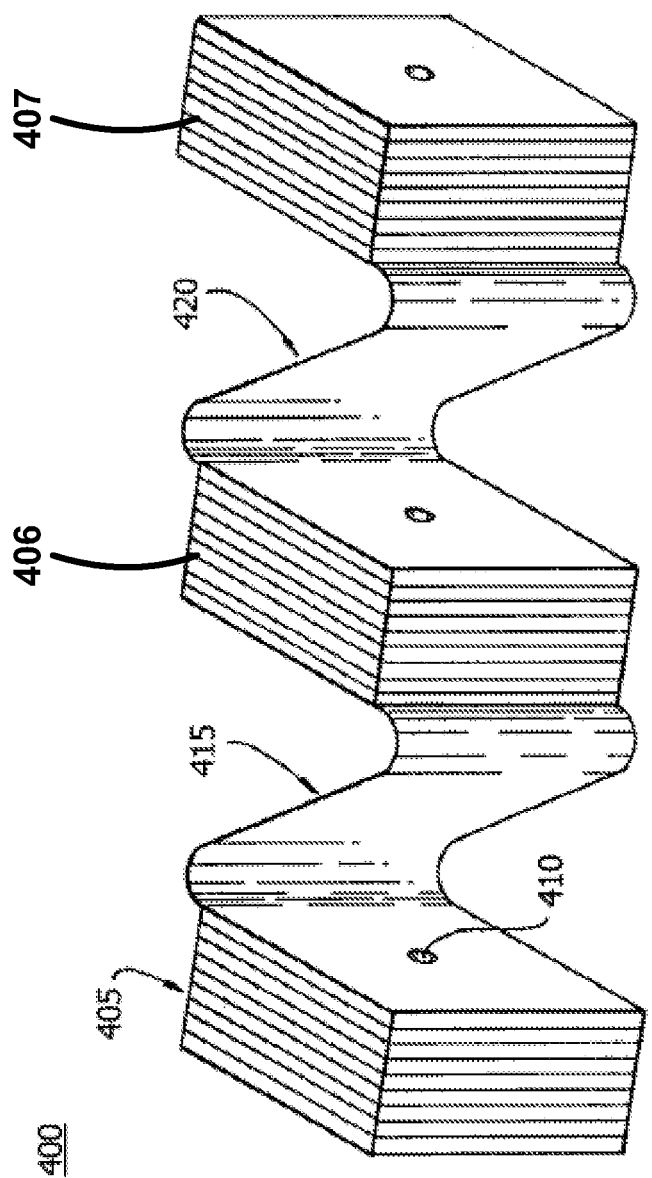
FIG. 5 shows the block structure of the high voltage stack and the interface components used to stack the voltage into increments, according to an embodiment.

FIG. 5 shows a device 400 having three stacks of cells 405, 406, 407 coupled together in series. This can be done to increase the voltage standoff of the device 400. In some embodiments, a stack-to-stack interface 415 can be used to couple a first stack of cells 405 to a second stack of cells 406. In coupling the first stack 405 to the second stack 406, the stack-to-stack interface 415 can be coupled to an electrode other than the outermost bare electrode (e.g., component 245 in FIG. 3). For example, the stack-to-stack interface 415 can be coupled to the second electrode in the first stack 405 rather than the outermost bare electrode.

The stack-to-stack interface 415 is coupled to the second stack 406, electrically coupling the first stack 405 with the second stack 406. The stack-to-stack interface 415 can be coupled to the outermost bare electrode of the second stack 406 or the second electrode in the second stack 406. The stack-to-stack interface 415 can be coupled to the first stack 405 and the second stack 406 by any suitable method, such as ultrasonic welding or the like. The resulting concatenated linkage(s) enable the voltage dividing necessary to be able to stack up to the complete EDLC voltage requirement.

An aperture 410 is defined by each component area whether or not the component includes separator material. These apertures 410 allow an electrolyte to be filled throughout the enclosed cavity, to permeate the porous activated carbon, and saturate the separator. Since these apertures 410 are thru-connected per stack of cells only and each stack remains at its own potential, the apertures 410 can be plugged after the electrolyte is inserted into the apertures 410. In order to ensure a complete fill and to keep the oxygen level as low as possible, the stack can be first evacuated and back filled, replacing the vacuum with nitrogen such that air contaminates do not linger, forming a premature breakdown in the electrolyte when refilled. Once the nitrogen has saturated the carbon and separator material, the process is reversed, allowing the electrolyte to replace the nitrogen. Sealing can be provided with Solef 1008, formed into a slug and injected into the stack through the holes. As the plug is injected it can be heated first to expand the material entering into the cavity and then cooled to provide a smooth thin outline on the exterior of the cavity.

A stack can include as many cell components as needed to obtain the desired capacitance. The stack-to-stack interface between stacks can be kept as short as possible. In some embodiments, the stack-to-stack interface between the stacks can be no more than one component in length. There can be as many stack-to-stack interfaces as needed to supply the voltage standoff required for a particular application.

Figure 6:
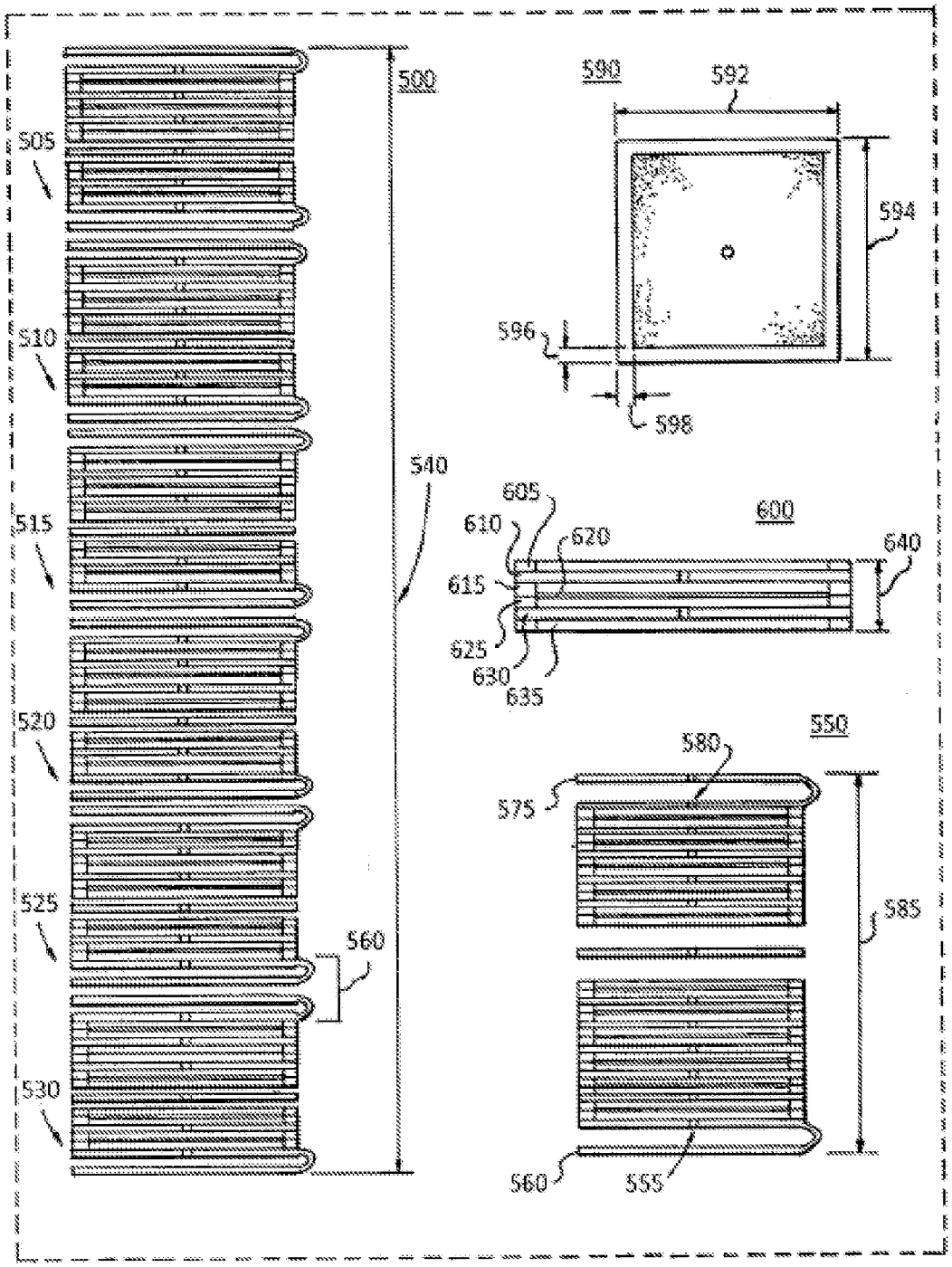
FIG. 6 is a schematic view of the detailed high voltage EDLC, according to an embodiment.

The resultant cascading of stacks attached into one series stack can be seen in FIG. 6. In one embodiment, for example, the complete invention example assembly 500 can have a capacitance of 58 farads rated at 15 volts. In other embodiments, any capacitance rated at any voltage can be obtained by varying the properties of each cell, the number of cells in a stack, and the number of stacks connected in series. Additionally, as described above, the capacitance and voltage rating can be varied by connecting multiple stacks in parallel. FIG. 6 shows six stacks 505, 510, 515, 520, 525, 530 having equal capacitance and structure coupled to each other in series. The total voltage 540 can be determined by the number of stacks within the structure and the electrolyte. In some embodiments, the electrolyte can be, for example, $TEABF_4$/acetonitrile or TEABF4/propylene carbonate and/or TEMABF4/acetonitrile or $TEABF_4$/propylene carbonate. In some embodiments, each stack 505, 510, 515, 520, 525, 530 can have a voltage rating of 2.7 or 2.5 volts when the above electrolytes are used.

In some embodiments, the electrode 590 can be 50 mm in width 592 and 50 mm in height 594. In other embodiments, the electrode can have any other suitable width and/or height. In some embodiments, the sealant material 596, 598 printed on the perimeter of each electrode can be less than 5 mm wide. In other embodiments, the sealant material can have a width greater than 5 mm. In some embodiments, the electrode 590 can be approximately 162 µm wide, including electrode ink printed on both sides of the current collector. Measuring the surface area using the technique disclosed in co-pending patent application Ser. No. 12/151,811, activated carbon mix and the amount of material used, the specific capacitance can be determined. From the above information the calculated capacitance equals the working volume of the electrodes multiplied by the specific capacitance of a single electrode assembly. In the 58 farad, 15 V assembly, for example, the calculated capacitance can be approximately 10.14 farads.

An electrode assembly 600 shows the individual layers and the actual sequence of placement. A first electrode 605, 610, 615, on which electrode ink has been printed on both surfaces, is disposed on top of an aluminum current collector 610, adjacent to a separator 620. A second electrode 625, 630, 635, on which electrode ink has been printed on both surfaces, is disposed on top of an aluminum current collector 630. In the 58 farad, 15 V assembly, for example, the nominal thicknesses 605-635 can be obtained and summarized, having a total electrode assembly thickness result 640 of 357 µm or 0.357 mm.

The stack or voltage segment 550 shows the 35 components of each electrode or the 70 total half-cells that can be used in a 350 farad stack assembly, in some embodiments. In such an example, the total resulting thickness of the stack 585 can be 12.6 mm. Each end of the stack has stack-to-stack interface 560, 575 (FIG. 6). Such a stack-to-stack interface 560, 575 can be structurally and functionally similar to the stack-to-stack interfaces 415, 420 shown and described in FIG. 5. Each stack end has a different electrode polarity extending out, thereby forming the series connectivity.

Figure 7:
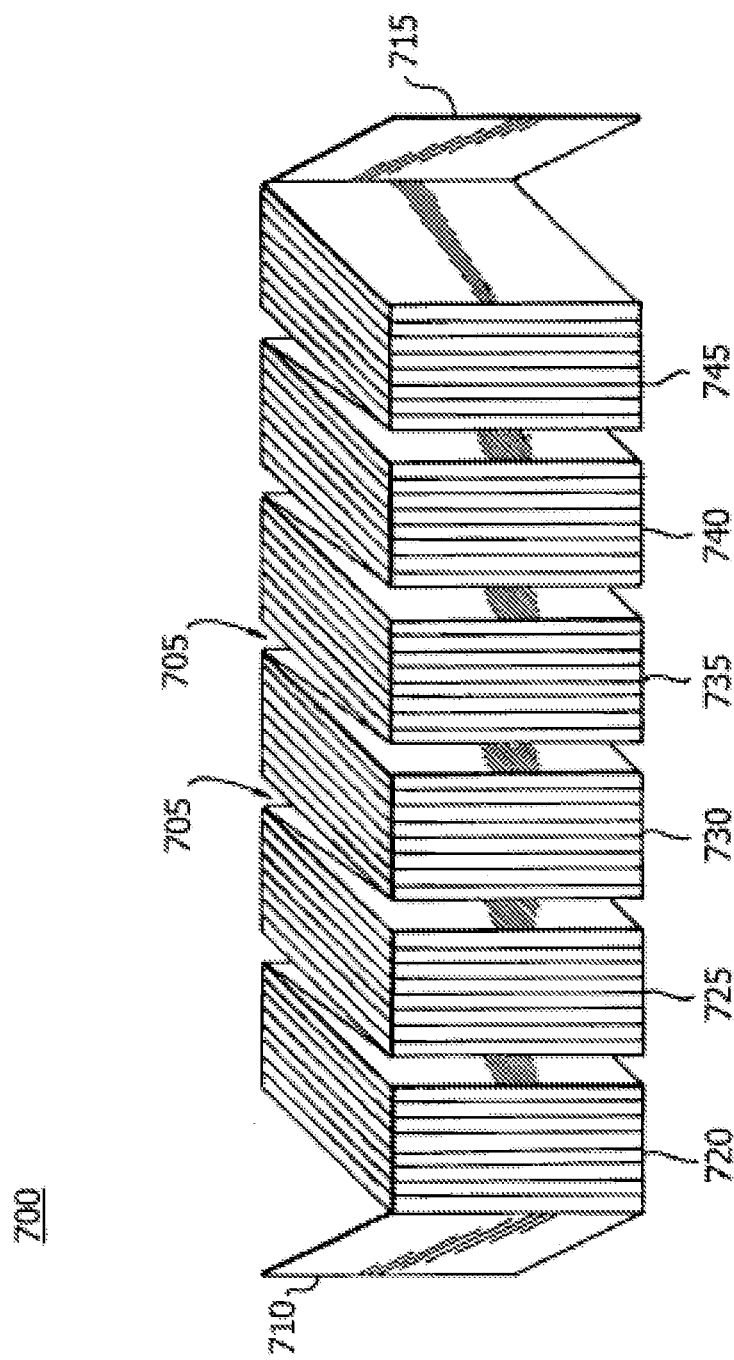
FIG. 7 shows a high voltage EDLC structure, according to an embodiment.

The aperture defined in each electrode is aligned with the apertures defined in the other electrodes 555, 580 (FIG. 6). As described above, electrolyte can be inserted into the device through the apertures. In some embodiments, after an individual block has been filled with electrolyte, the holes are plugged with a PVDF homopolymer and sealed, leaving a uniform finish on the surface. Each block section is similarly filled with electrolyte until the total stack is completed. Since each block is mechanically and electrically temporarily fitted, preliminary tests for acceptance, such as capacitance and voltage withstanding, can be measured at this stage of manufacture. FIG. 7 shows a semifinal view of the complete example high voltage stack 700. The extended electrical end current collector components, negative 710 and positive 715, stack-to-stack interfaces 705 and capacitive stack sections 720, 725, 730, 735, 740, 745 are shown in exploded detail.

In some embodiments, a high voltage stack 700 having multiple stack sections 720, 725, 730, 735, 740, 745 (e.g., multiple unit cells) coupled together in series can be coupled in parallel to one or more other high voltage stacks. This can be similar to the parallel connection shown and described with respect to FIG. 3A.

Figure 8:
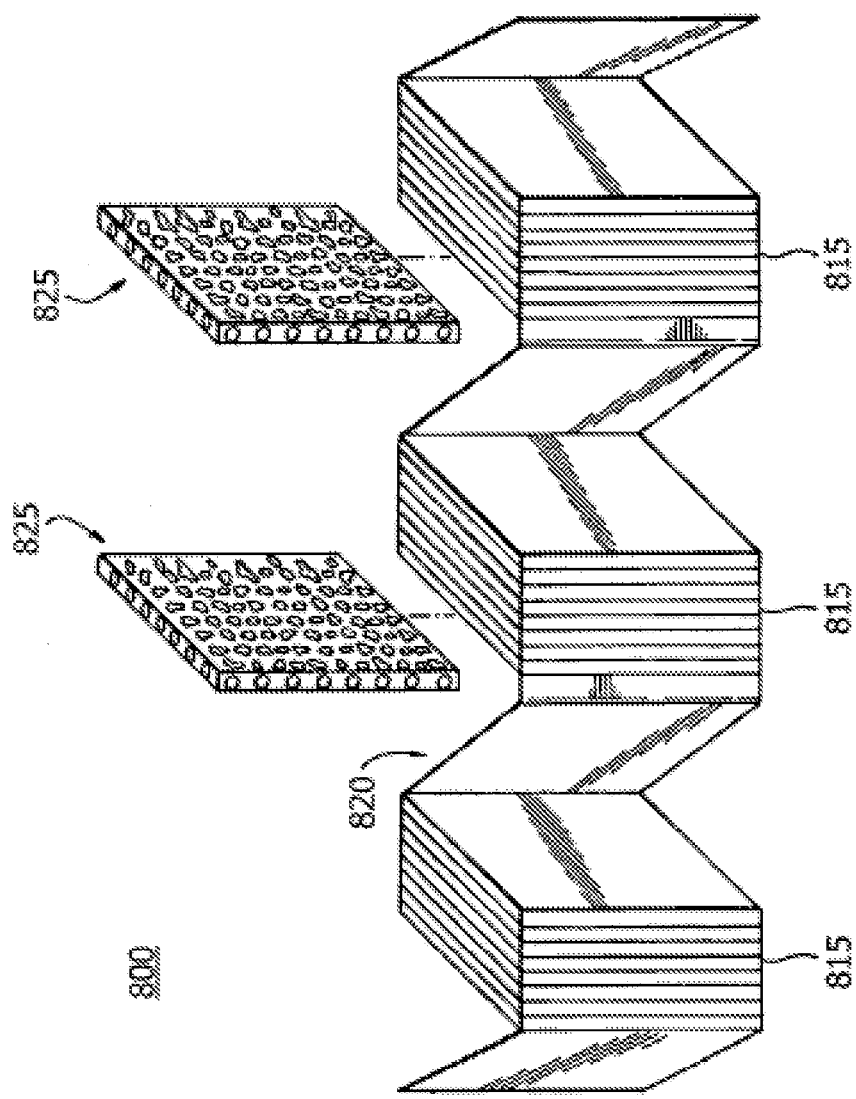
FIG. 8 shows a thermal transfer material being added into a high voltage EDLC, according to an embodiment.

In some embodiments, an efficient thermal heat transfer mechanism can be used to remove internally heated mass to an exterior, cooler environment. For example, as the high voltage EDLC operates, continued power cycling generates unwanted heat within the structure. FIG. 8 shows a device 800 having three stacks of electrodes 815 coupled together via two stack-to-stack interfaces 820. A transfer material 825 can be inserted at the intersections of the stack-to-stack interfaces 820. In some embodiments, the transfer material 825 can be a thin porous and thermally efficient conductive transfer material, such as a conductive epoxy and/or the like. In some embodiments, the transfer material can be prefabricated to help direct and dissipate unwanted heat. In some embodiments, the transfer material 825 can be added when an application requires either continual power cycling or a high level of deep drawn voltage surges requiring large masses of charged ionic particles to migrate between the EDLC's double layers. Additionally, the 90 degree offset folding scheme described in FIG. 3 and the two exposed edges 710, 715 shown in FIG. 7, create a unique natural thermal dissipater. These exposed aluminum side ended areas conduct internally generated heat into the containment shell shown in FIG. 9.

Figure 9:
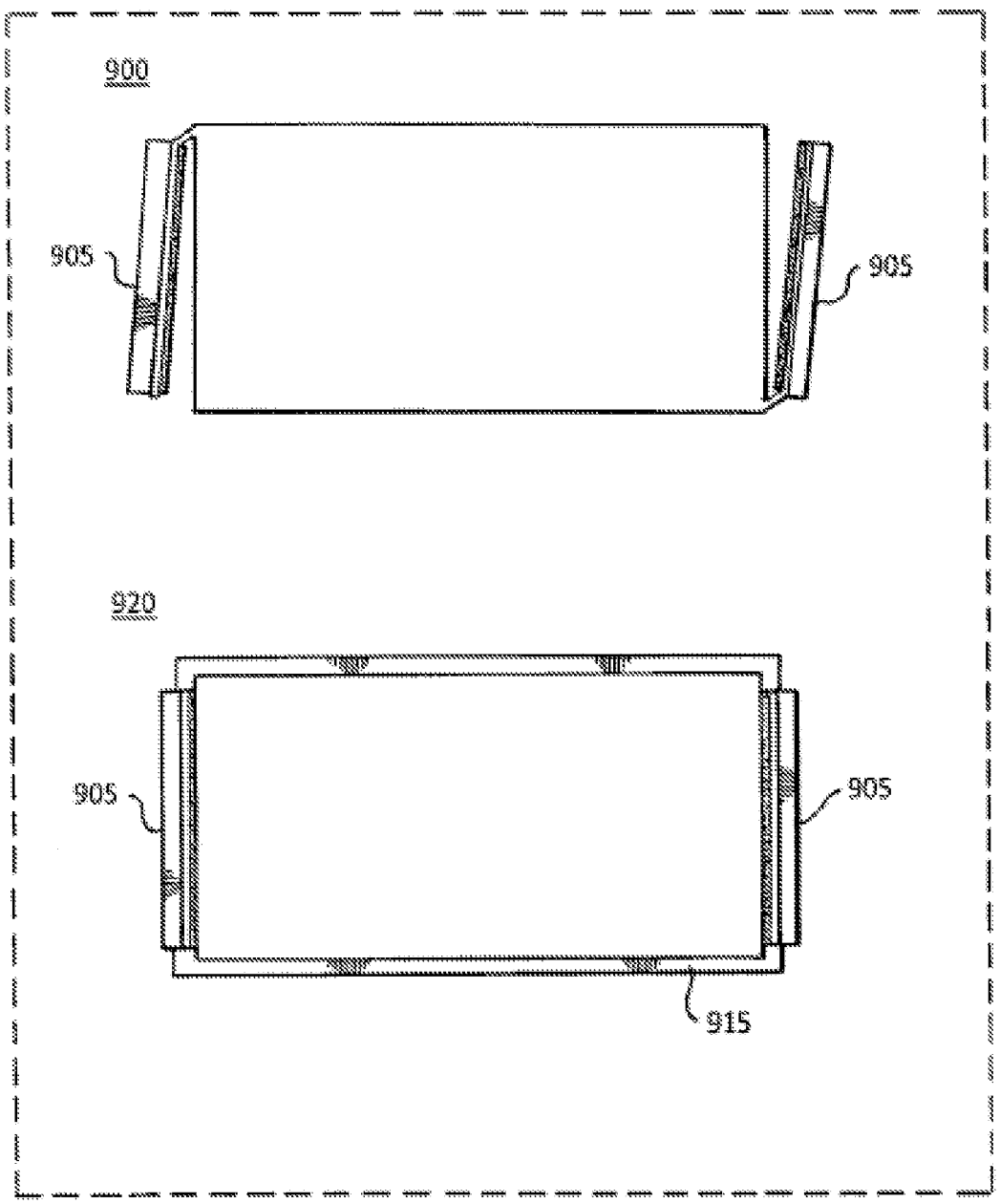
FIG. 9 is a schematic view of a final high voltage design packaging, according to an embodiment.

FIG. 9 shows a complete stack 900 compressed into its final form and a complete stack 920 disposed within the final package 915. The aluminum current collector components that remain on the left and right sides for terminal connection are connected by sonic or electrical spot welding to preformed terminal plates and/or pole pieces. As can be seen in FIG. 9, the complete stack 900 includes welded pole pieces 905. These pole pieces are part of the final package 915 and are constructed to allow a high density polyethylene (HDPE) to be formed around the peripheral surface to ensure an airtight seal of the final package 915. Aluminum or stainless steel pole pieces 905 are used to solidify the ends into a final package 915, allowing the EDLC components to electrically gain access through the packaging. The solid pole pieces 905 help commute the internal heat buildup from the inside to the outside of the package.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

While methods and apparatus are shown and described above as printing and assembling electrodes for EDLCs, in other embodiments, such methods and apparatus can be used to print and/or assemble electrodes for pseudocapacitors, batteries and/or any other device having an electrode. For example, pseudocapacitors have a similar structure and characteristics to EDLCs and can thus, be manufactured using the above described methods. Pseudocapacitors include cells with one electrode having metal oxide as the active material and the other electrode having activated carbon as the active material. The metal oxide can be printed onto a substrate using the methods and apparatus described above. The metal oxide electrode of a pseudocapacitor stores energy using a faradic reaction on the electrode surface (e.g., similar to battery technology) in addition to using surface area storage similar to EDLCs. Accordingly, in some embodiments, a pseudocapacitor can have a higher energy density than a similarly sized EDLC. Moreover, in some embodiments, the load of the metal oxide of a pseudocapacitor is three times the load of an EDLC having similar sized printed electrodes. Accordingly, pseudocapacitor cells can occupy a much smaller volume than an EDLC with the same capacitance.

While various embodiments have been described above, it should be understood that they have been presented by way of example only, and not limitation. Where methods described above indicate certain events occurring in certain order, the ordering of certain events may be modified. Additionally, certain of the events can be performed concurrently in a parallel process when possible, as well as performed sequentially as described above.

Although various embodiments have been described as having particular features and/or combinations of components, other embodiments are possible having a combination of any features and/or components from any of embodiments where appropriate. For example, each stack of electrodes can include any number of cells.

What is claimed is:

1. A method of manufacturing an electrode, comprising:
printing a first electrode ink on a first substrate such that the first electrode ink defines a pattern on the first substrate, the pattern on the first substrate including a plurality of substantially similar shaped portions, each portion being separated from every other portion;
allowing the first electrode ink to dry on the first substrate;
printing a separator material on top of at least one portion of the plurality of substantially similar shaped portions included in the pattern defined by the dried first electrode ink on the first substrate;
printing a second electrode ink on a second substrate;
allowing the second electrode ink to dry on the second substrate; and
folding the first substrate with the second substrate to couple a portion of the second substrate with the at least one portion of the first substrate such that the second electrode ink contacts the separator material.

2. The method of claim 1, wherein the pattern on the first substrate includes a plurality of rectangular portions, and wherein the printing the first electrode ink further includes aligning the rectangular portions along the first substrate.

3. The method of claim 1, wherein the pattern on the first substrate includes the plurality of rectangular shaped portions, and wherein the printing the first electrode ink further includes spacing each rectangular shaped portion an equal distance from each adjacent rectangular shaped portion of the plurality of rectangular shaped portions.

4. The method of claim 1, wherein the printing the first electrode ink on the first substrate includes printing the first electrode ink using a rotary lithographic printer having a first rotating drum and a second rotating drum, the first rotating drum pressing the first electrode ink through a mesh and onto the first substrate as the substrate passes between the first rotating drum and the second rotating drum.

5. The method of claim 1, wherein the printing the first electrode ink on the first substrate includes printing the first electrode ink using a rotary lithographic printer having a first rotating drum and a second rotating drum, the first rotating drum pressing the first electrode ink through a mesh and onto the first substrate as the first substrate passes between the first rotating drum and the second rotating drum, an amount of first electrode ink applied to the first substrate being varied with a thickness of the mesh.

6. The method of claim 1, wherein the first substrate is aluminum.

7. The method of claim 1, further comprising:
printing a sealant wall around each portion from the plurality of substantially similar shaped portions.

8. The method of claim 1, wherein the separator material is printed on top of the first electrode ink using a rotary lithographic printer having a first rotating drum and a second rotating drum, the first rotating drum pressing the separator material through a mesh and onto the first electrode ink as the first substrate passes between the first rotating drum and the second rotating drum, an amount of separator material applied to the first electrode ink being varied with a thickness of the mesh.

9. The method of claim 1, further comprising:
cutting the first substrate to a desired size.

10. The method of claim 1, wherein the first electrode ink includes activated carbon being in electrical connection with the first substrate when disposed on the first substrate.

11. A method of manufacturing an electrode, comprising:
printing an electrode ink on a portion of a substrate using a rotary lithographic printer;
allowing the electrode ink to dry on the portion of the substrate;
printing a separator material on the portion of the substrate using the rotary lithographic printer; and
printing a sealant wall around the portion of the substrate using the rotary lithographic printer, wherein the printing the electrode ink on the portion of the substrate includes printing the electrode ink using the rotary lithographic printer having a first rotating drum and a second rotating drum, the first rotating drum pressing the electrode ink through a mesh and onto the portion of the substrate as the substrate passes between the first rotating drum and the second rotating drum.

12. A method of manufacturing an electrode, comprising:
printing an electrode ink on a portion of a substrate using a rotary lithographic printer;
allowing the electrode ink to dry on the portion of the substrate;
printing a separator material on the portion of the substrate using the rotary lithographic printer; and
printing a sealant wall around the portion of the substrate using the rotary lithographic printer, wherein the portion of the substrate is a first portion of the substrate, the method further comprising:
printing the electrode ink on a second portion of the substrate using the rotary lithographic printer substantially simultaneous to the printing the electrode ink on the first portion of the substrate, the first portion of the substrate being spaced a distance from the second portion of the substrate.

13. A method of manufacturing an electrode, comprising:
printing an electrode ink on a portion of a substrate using a rotary lithographic printer;
allowing the electrode ink to dry on the portion of the substrate;
printing a separator material on the portion of the substrate using the rotary lithographic printer; and
printing a sealant wall around the portion of the substrate using the rotary lithographic printer, wherein the substrate is a first substrate, the method further comprising:
printing an electrode ink on a portion of a second substrate using the rotary lithographic printer;
allowing the electrode ink to dry on the portion of the second substrate;
printing a sealant wall around the portion of the second substrate using the rotary lithographic printer; and
coupling the portion of the first substrate with the portion of the second substrate such that the electrode ink printed on the portion of the second substrate contacts the separator material printed on the portion of the first substrate.

14. The method of claim 12, wherein the substrate is aluminum.

15. The method of claim 12, further comprising:
cutting the substrate to a desired size.

16. A method of manufacturing an electrode, comprising:
printing an electrode ink on a portion of a substrate using a rotary lithographic printer;
allowing the electrode ink to dry on the portion of the substrate;
printing a separator material on the portion of the substrate using the rotary lithographic printer; and
printing a sealant wall around the portion of the substrate using the rotary lithographic rip rater, wherein the printing the electrode ink on the portion of the substrate includes printing the electrode ink using the rotary lithographic printer having a first rotating drum and a second rotating drum, the first rotating drum pressing the electrode ink through a mesh and onto the portion of the substrate as the substrate passes between the first rotating drum and the second rotating drum, an amount of electrode ink applied to the portion of the substrate being varied with a thickness of the mesh.

* * * * *